US008576707B2

(12) United States Patent
Landwehr et al.

(10) Patent No.: US 8,576,707 B2
(45) Date of Patent: Nov. 5, 2013

(54) METHOD AND APPARATUS FOR BUS COUPLING OF SAFETY-RELEVANT PROCESSES

(75) Inventors: Heinz-Carsten Landwehr, Lemgo (DE); Viktor Oster, Blomberg (DE); Rainer Esch, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 1449 days.

(21) Appl. No.: 11/205,805

(22) Filed: Aug. 17, 2005

(65) Prior Publication Data
US 2006/0087967 A1 Apr. 27, 2006

(30) Foreign Application Priority Data
Aug. 17, 2004 (DE) .......................... 10 2004 039 932

(51) Int. Cl.
*H04J 3/14* (2006.01)
(52) U.S. Cl.
USPC .......................................................... 370/228
(58) Field of Classification Search
USPC .................. 714/51; 700/108, 79; 370/228
See application file for complete search history.

(56) References Cited

U.S. PATENT DOCUMENTS

| 5,984,504 | A  | * | 11/1999 | Doyle et al. ................. 700/108 |
| 6,161,202 | A  | * | 12/2000 | Kuntzsch et al. ............... 714/51 |
| 6,594,714 | B1 |   | 7/2003  | Swanson et al. |
| 6,909,923 | B2 | * | 6/2005  | Vasko et al. ..................... 700/79 |
| 6,915,444 | B2 |   | 7/2005  | Vasko et al. ........................ 714/4 |
| 7,088,696 | B1 |   | 8/2006  | Kawabe et al. |
| 2003/0051203 | A1 |   | 3/2003 | Vasko et al. |
| 2003/0167432 | A1 |   | 9/2003 | Zhang et al. |
| 2004/0181296 | A1 |   | 9/2004 | Muneta et al. |
| 2004/0199837 | A1 |   | 10/2004 | Meyer-Grafe et al. |
| 2004/0210620 | A1 |   | 10/2004 | Muneta et al. |

FOREIGN PATENT DOCUMENTS

| DE | 19532639 | 2/1997 |
| DE | 19920299 | 11/2000 |
| DE | 19939567 | 3/2001 ............... G05B 9/02 |
| DE | 10037737 | 2/2002 |
| DE | 10065907 | 9/2002 |

(Continued)

OTHER PUBLICATIONS

Office Action dated Jun. 19, 2009 corresponding to Japanese Patent Application No. 2005-235667.

(Continued)

*Primary Examiner* — Mark Rinehart
*Assistant Examiner* — Gbemileke Onamuti
(74) *Attorney, Agent, or Firm* — Ohlandt, Greeley, Ruggiero & Perle, L.L.P.

(57) ABSTRACT

A method and an apparatus are provided, which provide for single-channel bus coupling of safety-relevant processes. The method is distinguished in that a data record which is relevant for the safety-critical process is processed via at least two redundant processing channels, in particular on a protocol-specific basis, in accordance with identical laws for in each case one safe protocol and the redundant safety messages for single-channel bus coupling are joined together to form a common safe protocol, to be precise in that each of the processing channels accesses a common buffer register, with write authorization for each register location being allocated only once, in such a way that the common safe protocol is joined together in components by in each case writing in different components of the respective safety messages.

19 Claims, 4 Drawing Sheets

(56) References Cited

FOREIGN PATENT DOCUMENTS

| | | | | |
|---|---|---|---|---|
| DE | 100659075 | 9/2002 | ............. | G06F 11/08 |
| EP | 1188096 | 3/2002 | | |
| EP | 1439657 | 7/2004 | | |
| JP | 10307603 | 11/1998 | | |
| JP | 2004103241 | 4/2004 | | |
| JP | 2004145746 | 5/2004 | | |
| JP | 2004227575 | 8/2004 | | |
| WO | WO99/14611 | 3/1999 | | |
| WO | WO 00/79353 | 12/2000 | ............. | G05B 19/05 |
| WO | WO 01/24385 | 4/2001 | | |
| WO | WO 01/24391 | 4/2001 | ............... | H04B 1/62 |
| WO | WO02/095722 | 11/2002 | | |
| WO | WO02/098065 | 12/2002 | | |
| WO | WO03/001749 | 1/2003 | | |

OTHER PUBLICATIONS

Examiner's Refusal Decision dated Jun. 24, 2010 corresponding to Japanese Patent Application No. 2005-235667.
Examiner's Office Letter dated Dec. 14, 2011 corresponding to Japanese Patent Application No. 2010-241825.
Appeal Examiner's Office Letter dated Mar. 21, 2012 corresponding to Japanese Patent Application No. 2005-235667.

* cited by examiner

METHOD AND APPARATUS FOR BUS COUPLING OF SAFETY-RELEVANT PROCESSES

CROSS-REFERENCE TO RELATED APPLICATION

The present application is claiming priority of German Patent Application No. 10 2004 039 932.8, filed on Aug. 17, 2004, the content of which is herein incorporated by reference.

BACKGROUND OF THE INVENTION

1. Field of the Invention

The invention relates to a method and to an apparatus which is adapted for carrying out the method, for single-channel bus coupling of safety-relevant processes.

2. Description of the Related Art

In the following text, the expression "a safety-relevant process" means a process which does not result in more than a negligible risk to people and/or to material goods either when a fault occurs. In a safety-relevant process, it is therefore necessary to ensure with 100% confidence in the ideal case that, when a fault is present, this process, a subsequent process that is coupled to this process, and/or an overall system which includes this process are/is brought to a safe state. Safety-relevant processes such as these may thus also be process elements of larger, higher-level overall processes. Examples of safety-relevant processes are chemical processes in which it is essential that critical processes be kept in a predetermined range, complex machine control systems, for example for a hydraulic press or a production line, in which case, by way of example, the starting up of a pressing/cutting tool may repesent a safety-relevant process element. Further examples of safety-relevant processes (process elements) are the monitoring of protective guards, protective doors or light areas, the control of two-handed-operation switches or else the reaction to emergency off switches.

It is thus absolutely essential for all safety-relevant processes that the respectively associated safety-relevant data that is produced, recorded or measured is transported in real time without any corruption, since any corruption can result in an incorrect operation and/or reaction which, in the end, may endanger people's lives and health.

In order to comply with the safety regulations, numerous agreements have been reached in recent years, which require virtually error-free data transport when using bus systems. These relate in particular to the data transport itself and to a permissible residual error probability as a function of the respective application and/or of the respective process. Relevant standards which may be quoted in this case include, in particular, EN 61508 and EN 954-1, as well as the principles for testing and certification of "bus systems for the transmission of safety-relevant messages" produced by Test and Certification Center of the German Industrial Professional Societies.

Safety-based bus systems have been developed in accordance with these agreements and standards, which transmit data with high redundancy. Possible faults or errors are discovered in good time, and any risk can be avoided. Examples of this include, inter alia, the Safety Bus P, Profibus F, Interbus Safety etc.

However, one disadvantage in this case is that already installed bus systems must be replaced for the use of safety-based bus systems, and it is frequently necessary to accept restrictions to the number of subscribers, to the data transport rate or to the data protocol.

In consequence, safety-based methods and/or components have been developed which allow simpler and lower-cost retrofitting of already existing bus systems. The (field) bus systems which are already used between the individual units involved in a process are in this case used for data communication for transmission of safety-relevant data, in particular between sensors, actuators and/or control devices, particularly in the case of electronic safety methods which are used for control and automation technology.

By way of example, EP 1 188 096 B1 discloses a control system for a safety-relevant process with a field bus via which a control unit for controlling the safety-relevant process and a signal unit which is linked via I/O channels to the safety-relevant process are connected. In order to ensure failsafe communication with one another, these units have safety-related devices whose aim 1s to make units that are not safe become safe units. In detail, at least two redundant processing channels are in each case provided in such a way that an error or fault in one of the processing channels can be identified and possibly corrected on the basis of a result which differs from that of another of the redundant processing channels. This multiple channel structure is provided in particular by two redundant computers, with the safety analysis ending after the two redundant computers and the analysis being used for a safe data protocol from this point, without any further statements.

In the following text, the general word computer essentially means any type of data processing devices such as microcomputers, microprocessors, microcontrollers or else PCs.

WO 01/24385 A2 also relates to the control of safety-relevant processes using (field) bus systems, with the units which are involved in the control of the safety-relevant process once again generally having redundant processing channels. Each of the redundant channels has a computer, and the computers monitor one another. This multiple channel structure is changed to a single-channel structure by means of a further computer which is connected to the field bus (FIG. 3). The document does not contain any more far-reaching statements, including the change from the multiple channel form to the single-channel form.

WO 01/24391 A1 and the Laid-Open Specification DE 199 39 567 A1 are further examples of safe bus subscribers with redundant processing channels which monitor one another for safe protocol creation, and/or computers and a subsequent change from the two-channel form to the single-channel form via a further computer which is coupled to the bus and is connected to a protocol chip or is integrated in it. In this case as well, the safety analysis ends without the disclosure of further technical measures based on the two redundant computers, and the analysis for a safe data protocol comes into play from this point.

Patent Specification DE 195 32 639 C2, which relates to a device for single-channel transmission of data formed by two redundant computers, integrates the function of bus coupling into one of the two redundant computers in order to reduce the circuit complexity. Only that computer which has the bus coupling functionality thus has an output channel, to which useful data originating from this computer and test data originating from the other computer are supplied, or vice versa, or useful data and test data from both computers are supplied, interleaved in one another (FIG. 4). However, in order to ensure that the computer which is controlling the bus is not able to produce messages which the other computer cannot influence, the implementation of the safety analysis involves increased complexity since, on the one hand, the freedom from reactions and on the other hand the independence of the computers for creation of the safe protocol must be verified. In this context, the patent specification proposes only appropriate connection and non-connection of the respective computer outputs.

Furthermore, DE 100 65 907 A1 describes a method, based on the principle of "redundancy with cross-over comparison" for safe data transport for data transmission on parallel or series networks or bus systems, using a buffer register with two logically identical data areas for changing from the two-channel form to the single-channel form. The complete, safety-based message to be transmitted on one channel via the bus system includes the data contents of both data areas of the buffer register. Two redundant computers are once again connected upstream of the buffer register at the transmitter end and, depending on the nature of the application, in each case preprocess safety-relevant data (which is made available on one channel or two channels) with redundant information to form safe data, which they interchange with one another for checking. If both come to the same result, each of the computers transfers its safe data to the buffer register, with each data area being filled with the safe data from in each case one computer, which data itself already contains redundant information for error or fault identification. If, in an alternative embodiment, the buffer register is contained in one of the two computers, such that this one computer in consequence appropriately fills both data areas of the buffer register after agreement with the second computer, this second computer reads out the buffer register with the two data areas once again, for monitoring. Depending on the application, the data content of one of the two data areas of the buffer register may also have inverted data or other additional interleaving in order, for example, to identify systematic faults in the transmitters, receivers and/or other units which pass on the data. This therefore has the particular disadvantage that the overall data length of the safety-based message is extremely large with respect to the actual useful data, and the data transmission rate for the actual useful data is thus low, since two identical useful data records as well as a respective redundant item of information for each of the identical useful data records has to be transmitted. If the number of useful data items to be transmitted per data packet decreases, as is the case by way of example with the Interbus, the ratio of the useful data length to the overall data length decreases to a greater extent.

SUMMARY OF THE INVENTION

One object of the invention is thus to provide a further, novel and improved approach for the change from the multiple-channel form to the single-channel form for safe bus coupling of safety-relevant processes, and to ensure in a manner that can be implemented easily, in particular additionally in a manner which can be tested easily, freedom from reactions and independence in the creation of a safety-based protocol which is intended to be transmitted as a safety message via a bus.

The solution according to the invention is achieved in a very highly surprising manner just by a subject matter with the features of one of the attached independent claims.

Advantageous and/or preferred embodiments and developments are the subject matter of the respective dependent claims.

Thus, according to the invention, a method is proposed for single-channel bus coupling of a safety-critical process, in which a data record which is relevant for the safety-critical process is processed via at least two redundant processing channels, in particular on a protocol-specific basis, in accordance with identical laws for in each case one safety-based protocol and the redundant safety-based protocols for single-channel bus coupling are joined together to form a common safety-based protocol, to be precise in that each of the processing channels accesses a common buffer register, with write authorization for each register location being allocated only once, in such a way that the common safety-based protocol, i.e. the safety message to be transmitted is joined together in components by in each case writing in different components of the respective safety-based protocols.

In consequence, one major advantage in this case is that, on the one hand, both processing channels are able to calculate the complete safety-based protocol in such a way that this has a positive effect on the required message length, since all of the data bits are already known, with the various safety mechanisms, in the redundant processing channels, and no additional data bits need be transmitted to allow the deduction of the correct calculation at the receiver end.

Furthermore, this ensures that one processing channel on its own is not able to send a safety message, with the control by means of the write authorization, which can in each case be allocated only once, for data in a registered location representing a capability which can be implemented easily and is highly efficient for ensuring low-cost, considerably better safety, independently of the bus (system) used.

The provision of an intelligent unit for carrying out the method according to the invention can thus be ensured just by the use of an apparatus which has at least two redundant computers and in which the computers for processing an identical input data record are designed using identical laws for in each case one safety-based protocol, and which are connected via a circuit arrangement to a common buffer register, in such a way that write access is given for only one of the computers in each case for each register location in the buffer register. Just by the use of standard components and independently of the respective bus system, the invention thus allows a highly dynamic, high-efficiency solution, which is simple to implement, for reaction-free and independent formation of a respective safety-based protocol.

The specific processing rules for formation of the safety message are in this case more expediently suitable to satisfy the respective safety requirements, in particular the safety requirements for a single transmission in accordance with SIL 3 IEC 61508.

When using an apparatus such as this, the circuit arrangement is expediently designed such that each of the computers can make read access to each register location in the buffer register.

This also makes it possible to ensure in a simple and low-cost manner using standard components in one preferred development that, before a transfer of the joint safety-based protocol from the buffer register to the bus for transmission of each of the redundant processing channels, read access can be made back to each register location in order to verify the jointly formed safety-based protocol. The additional comparison which this makes possible of the jointly formed safety-based protocol with the respective safety-based protocol which is formed separately or individually via the processing channel further considerably increases the safety achieved. In consequence, in the event of a computer failure or fault, it is impossible to produce a complete safety message, so that a fault is also necessarily identified and a safety-based function can be initiated.

A further increase in safety, beyond this, can also be ensured if, in one particularly preferred embodiment, before the writing of the joint safety-based protocol, the redundantly formed safety based protocols are first of all checked by the processing channels to ensure that they are the same as one another, so that a joint safety-based protocol is formed only in response to identical safety-based protocols which are processed independently of one another from an identical input data record. If a fault or error occurs in the redundant processing itself, this is thus identified at an even earlier stage, and the process can be changed to a safe state even earlier.

The intrinsically mutually decoupled computers are thus preferably connected to one another via a communication interface.

It is also advantageous to check a respective write authorization, which is in each case assigned to a processing channel in a defined manner, by means of a test procedure, for verification. The complete read access for each register location is also expedient for this purpose.

According to one preferred test procedure, an attempt is in this case made via each of the processing channels to write a respectively different, specifically associated default value to all of the register locations in the buffer register. Each of the processing channels then reads out all of the register locations of the buffer register, and verifies the contents of the register locations for unambiguous interleaving.

A test procedure such as this is expediently carried out more than once and/or by alternately writing to and reading from the register locations via different processing channels.

Essentially, every safety transfer/handover rule which is selected by the coupling of the data involved and to be transferred to the buffer register to specific positions or addresses within the joint safety-based protocol or within the buffer register can in consequence easily be tested, and every fault or error in the formation of a safety message to be transmitted, including those resulting from a computer failure, can thus be reliably identified.

After each protocol-specific processing of the input data to form a safety-based protocol, in order to ensure in particular that this protocol is stored and is transferred on a protocol-specific basis to the bus, with the safety-based protocol complying with the requirements based on the respective application, in particular as a function of the bus and/or of the processes, for a safe protocol data record, a computer according to one embodiment in each case has an integrated protocol chip. In an alternative embodiment, the protocol chip may also be connected on the output side to a computer. In order to avoid such integrated or downstream protocol chips and, in consequence, also to reduce the number of components and costs, a further, particularly expedient embodiment proposes that the computer be provided with software that is designed appropriately for processing and protocol-specific transfer of the data.

The apparatus according to the invention may be a bus subscriber unit, with the computers for this purpose expediently being connected on the input side at least to input channels for single-channel or multiple-channel linking of process data input units and, in a corresponding manner, for single-channel or multiple-channel recording of safety-relevant input data to be processed, or being in the form of a bus control unit which, for example, generates the safety-relevant input data to be processed. The computers are thus, in particular, microcontrollers or central processor units (CPUs).

The circuit arrangement for linking the computers according to the invention or, if appropriate, the protocol chips downstream from the computers, is in one preferred embodiment a simple logic circuit, in which case it is also possible to use large-scale integrated circuits, for example in the form of an FPGA (Field Programmable Gate Array) which may, additionally advantageously, also be application-specific.

The buffer register has an interface via which the joint safety-based protocol stored there can be coupled on one channel directly to the bus, for example an Interbus, or can be transferred on one channel to a further bus coupling device, which is designed on an application-specific basis and is connected upstream of the bus, in which case, in particular, a further protocol chip, a further microcontroller or some other intelligent unit may be used on an application-specific basis as the bus coupling device.

Just a standard RAM is thus sufficient for the buffer register. However, one preferred development provides in particular for the buffer register or the buffer store to be in the form of a dual port memory (DPM), so that the computers can be connected in a very simple and low-cost manner via one of the two interface ports, and the second interface port can be used for the single-channel coupling to the bus.

Further features and advantages of the invention will become evident from the following detailed description of one preferred embodiment, although this is only by way of example, of the invention and with reference to the attached drawings, in which:

DESCRIPTION OF THE INVENTION

Figure 1:
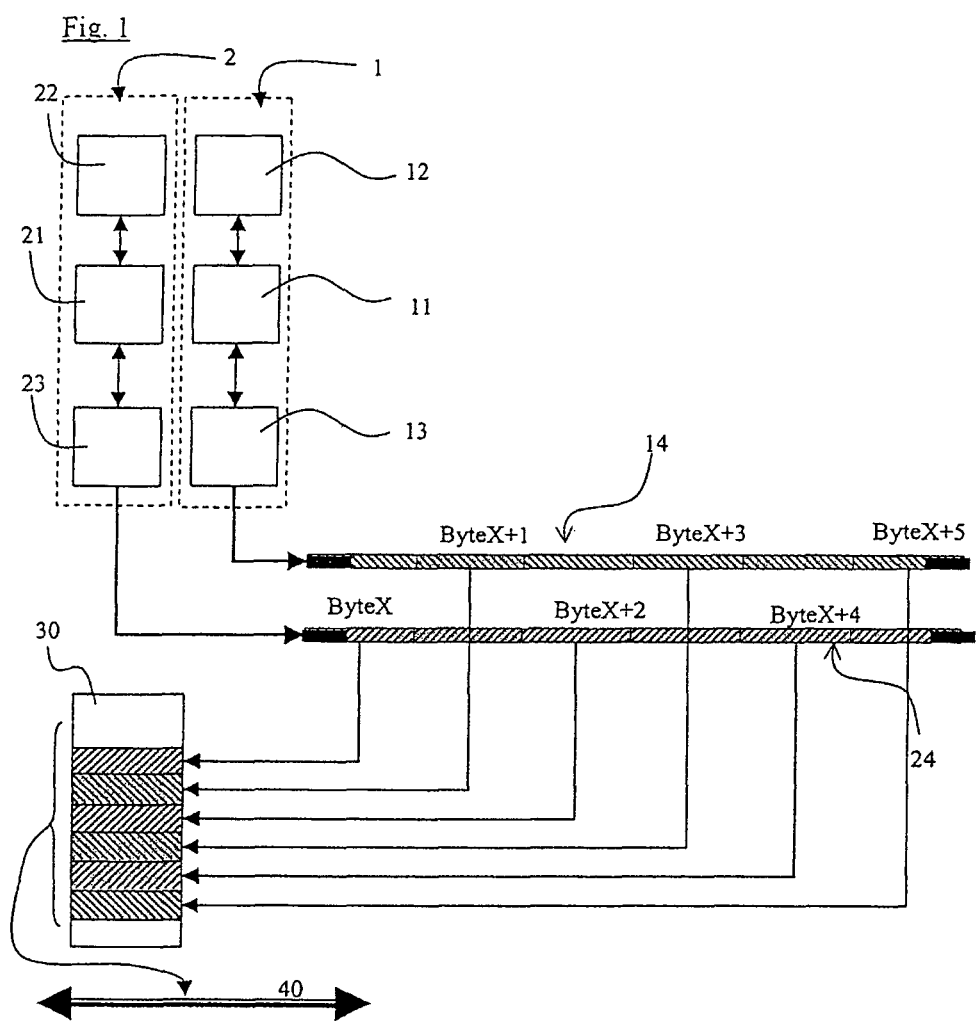
FIG. 1 shows a schematic outline sketch for redundant formation of safety-based protocols for a safety message to be transmitted by means of redundant processing channels, and subsequent joint formation of an identical safety-based protocol under the control of a transfer/handover rule, relating to the components in each case to be handed over/transferred from the safety-based protocols.

FIG. 1 illustrates two redundant processing channels 1 and 2 of a bus subscriber unit or bus control unit, which is not illustrated in any more detail, for coupling a safety-critical process to a bus 40, for example an Interbus. In the case of a bus subscriber unit, each of the processing channels is connected to input/output units, for example sensors and/or actuators, which are associated with the safety-critical process but are likewise not illustrated.

Thus, depending on the nature of the specific link, identical input data which is relevant for the safety-critical process is made available on one channel or two channels of the processing channels 1 and 2 to a bus subscriber unit with an application at the sensor end, and this data is expediently first of all stored in respective memories 12 and 22 for further processing. Particularly in the case of a bus control unit, safety-relevant input data to be preprocessed before bus transmission relating to safe data is located in memories 12 and 22.

First of all, before the transmission of a safety message via the bus 40, the input data is redundantly processed using the same laws to in each case form a safety-based protocol 14 and 24. The processing channels for this purpose have a respective microcontroller 11 or 21 for respective preprocessing/processing of the safety-relevant input data located in the memory 12 or 22 to form a safety-based respective protocol 14 or 24 and, in the embodiment shown in FIG. 1, a respective protocol chip 13 or 23, which is connected downstream from the respective microcontroller 11 or 21 and receives the safety-based respective protocol 14 or 24, as calculated by the respective microcontroller 11 or 21, for further transfer to the bus 40. In an alternative embodiment to the respective illustrated protocol chips 13 and 23, the microcontrollers 11 and 21 may also have appropriately configured software, so that the microcontrollers 11 and 21 provide the further transfer, which will be described in the following text, of the calculated protocols 14 and 24 to the bus 40.

In consequence, provided that no errors, faults or failures have occurred during the calculation, the calculated, safe or safety-based protocols 14 and 24 are identical. It should be noted that the safe protocols are in this case, of course, configured such that they comply with the requirements in the standard for safety-based transmission.

According to the invention, in order to enhance safety further, the joint formation of a further identical, common safety-based protocol is provided before the transmission of a safe message via the bus 40, and this can then be transferred on one channel to the bus 40 for transmission.

This joint safety-based protocol is formed by component-by-component composition of data of the safe protocol 14 and of data of the safe protocol 24 in a buffer store or buffer register 30 which can be accessed by each of the processing channels 1 and 2.

In order to prevent this safety-based protocol, which is to be formed jointly, being based only on data from only one of the processing channels 1 or 2, which in consequence would be equivalent to the transmission of a safety message by only one of the microcontrollers 11 or 21, for example on the basis of a failure having occurred in one of the two microcontrollers, a defined or definable access rule controls writing rights to the buffer store 30. The access rule in this case states the only parts of the respectively calculated safety-based protocol from each processing channel 1 and 2 which can be written to the appropriate memory locations in the buffer store 30 for the formation of the joint safety-based protocol are those for which a respective microcontroller 11 or 21 has a respective write authorization. Thus, according to the invention, only one write authorization is in each case defined for each memory or register location.

Based on the assumption that the safe protocols 14 and 24 are identical, each of the protocols thus also has the same number of bytes, annotated with ByteX to Byte X+5 in FIG. 1. In the present example as shown in FIG. 1, the write authorization for the memory addresses of the buffer store 30 for the byte X, the byte X+2 and for the byte X+4 is permanently allocated for the microcontroller 21 for the processing channel 2, and the write authorization for entering the byte X+1, the byte X+3 and the byte X+5 is allocated for the microcontroller 11 for the processing channel 1. In consequence, only one write authorization for entering every alternate byte in the buffer store 30 is allocated to each of the microcontrollers 11 and 21.

If, by way of example, X=0 and the redundant safety-based protocols 14 and 24 as well as the identical safety-based protocol to be formed jointly, that is to say the next safety message to be transmitted, comprise a total of 6 bytes, the data within the redundant safe protocols, and thus also within the safety message to be transmitted are composed, for example, of a header of 2 bits, followed by 14 bits of useful data, an address of 8 bits and a CRC checksum of 24 bits. The above write access authorization, which is allocated in a defined manner, results in the header, which comprises 2 bits, and the first 6 bits of the useful data being transferred, with reference to FIG. 1, from the safe protocol 24 calculated via the processing channel 2, the next 8 bits of useful data being transferred from the protocol 14 calculated via the processing channel 1, the address, which comprises 8 bits, in turn being transferred from the protocol data record 24, and the CRC checksum, which comprises 24 bits, being transferred component-by-component successively from the calculated protocols 14, 24 and 14.

Thus, even a standard RAM or, preferably and as can be seen from the following text, a standard DPM can be used as the buffer store.

Even only double redundancy results in further enhanced safety going beyond this if, in a further expedient manner, the microcontrollers 11 and 21 of both processing channels 1 and 2 are allocated complete read access to the buffer store 30.

This allows simple comparison of all of the data since, on the one hand, it is possible to check in a simple manner whether the jointly formed safe protocol which is to be transmitted as a safety message and which, by way of example, complies with the safety requirements for single transmission in accordance with SIL 3 IEC 61508 has no faults or errors, to be precise by respective verification against its own safety-based protocol 14 or 24, which will have already been formed separately. Furthermore, the complete read access for each of the processing channels 1 and 2 allows checking, which can expediently already be carried out in the environment of controlling/monitoring/regulating a safety-critical process, as to whether the access rule is generally carried out without any errors or faults. In this context, a check is carried out in particular to determine whether the calculated data of a respective microcontroller of the one or of the other processing channel is written exclusively (although this is guaranteed) only to the respectively assigned memory addresses in the buffer store 30.

If this "self-verification" and/or "cross-verification" leads to results that are not the same, an error or fault is necessarily identified, and a safety-based function is initiated.

By way of example by using software as described above instead of protocol chips, FIG. 2 illustrates one possible functional circuit diagram for the implementation of the write authorization sketched in FIG. 1, as well as the complete read authorization as the basis for these verification processes.

Figure 2:
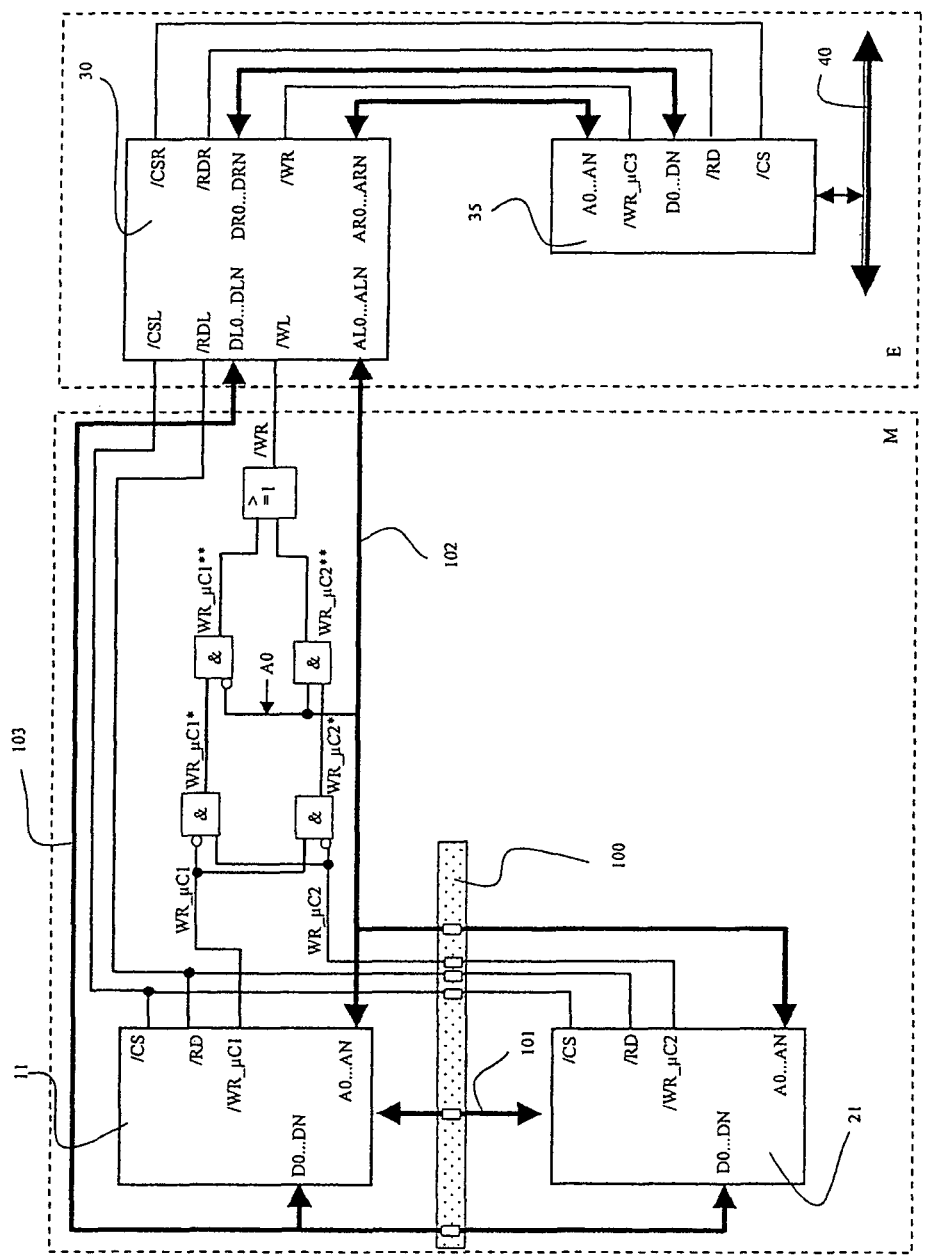
FIG. 2 shows one possible functional circuit diagram for implementation of the invention, based on two microcontrollers which each redundantly calculate the complete, safety-based protocol.
Figure 3:
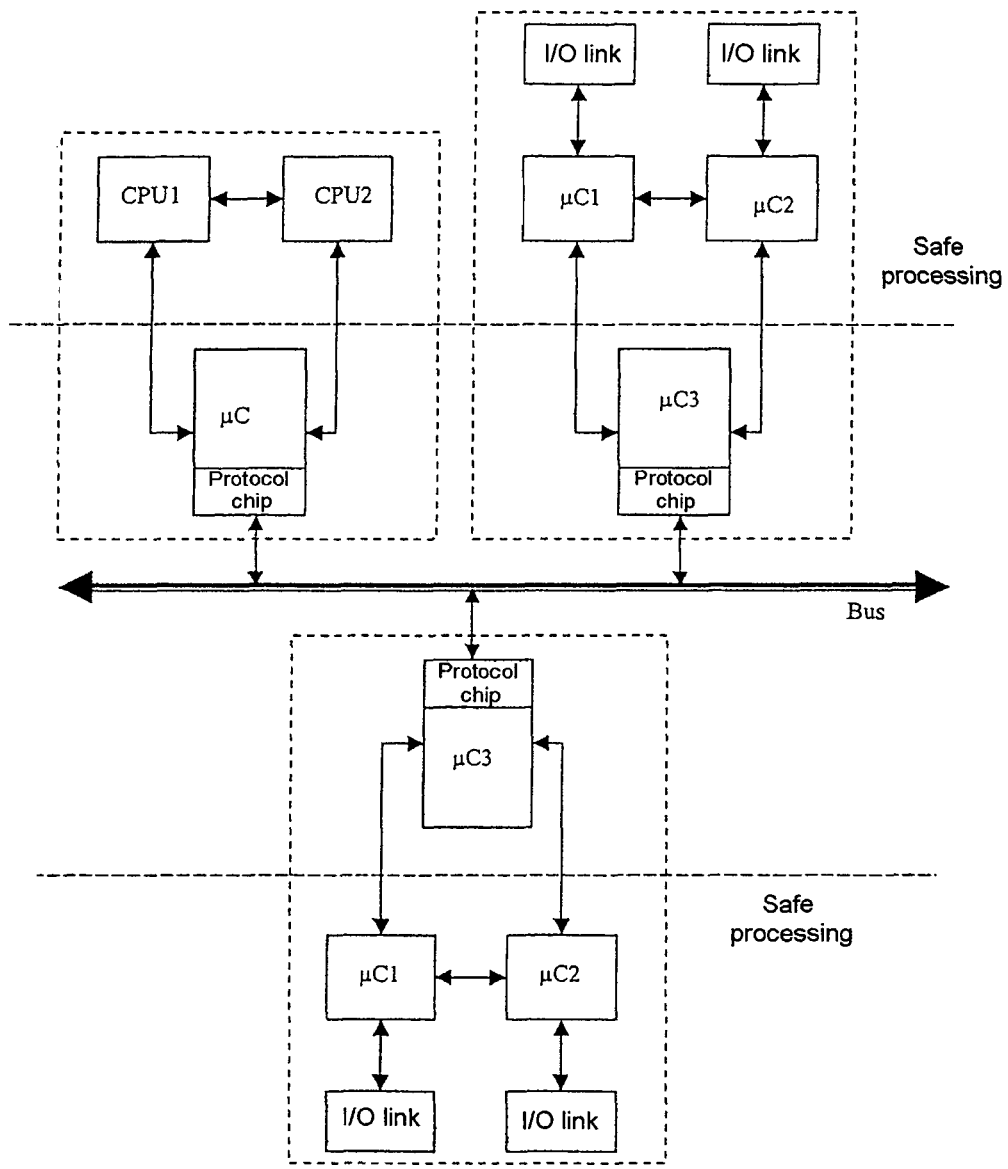
FIGS. 3 and 4 show known implementations for the change from the two-channel form to the single-channel form.
Figure 4:
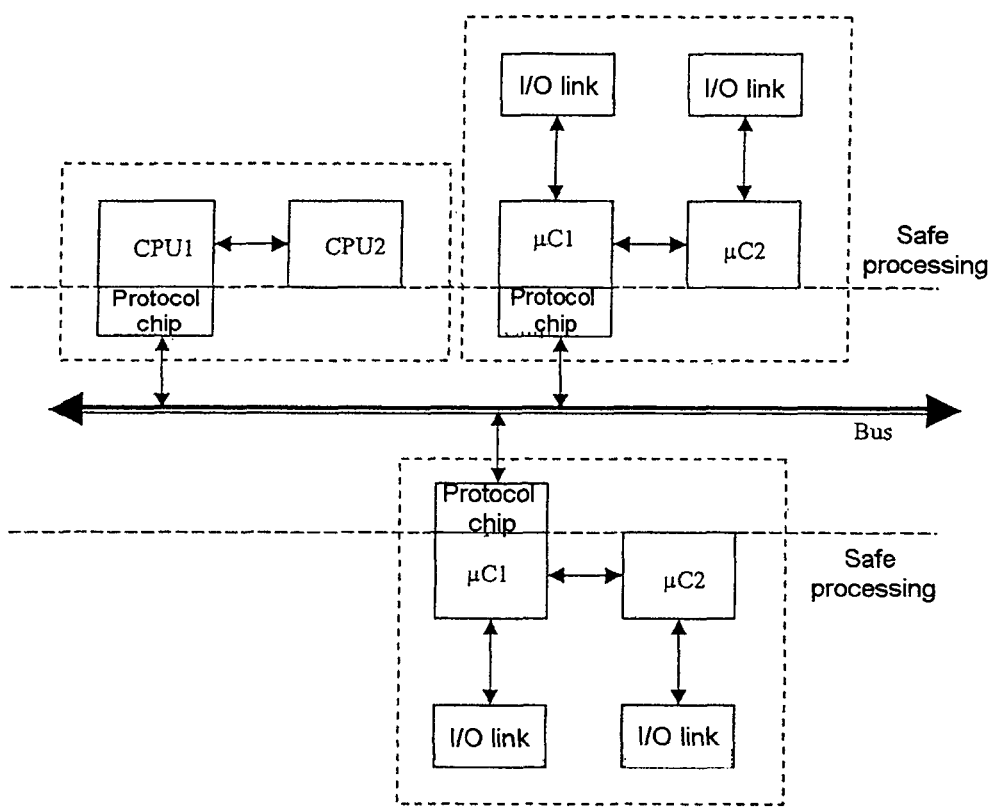

As illustrated in FIG. 2, the area which is illustrated on the left and is annotated by M has the multiple-channel architecture according to the invention with a safety analysis, and the right-hand area, which is annotated with E in FIG. 2, has the single-channel architecture with the jointly formed safety-based protocol to be transmitted as a safety message.

Thus, based essentially on FIG. 1, the two microprocessors 11 and 21 are decoupled in a manner known per se, identified by the reference number 100 in FIG. 2 and, furthermore, are connected to one another via a communication interface 101 for additional mutual checking of the respectively separately calculated safety-based protocols 14 and 24.

The address bus 102 for the addresses Ax, where x is between 0 and N, the databus 103 for the data Dx, where x is between 0 and N, as well as the signals /CS (Chipselect) and /RD (Read) are, as normal, applied directly to the standard DPM, which is illustrated in FIG. 2, at the appropriate pins for the signals /CSL and /RDL, respectively. The address line A0 is linked to the write signals /WR_µC1 and /WR_µC2 of the microcontrollers 11 and 21 such that only the microcontroller 11 has write authorization for the even-numbered addresses, and only the microcontroller 21 has write authorization for the odd-numbered addresses. These are the only two situations in which the write signal /WR can be initiated via the appropriate pin for the "low active" signal /WL at the RAM of the Standard DPM. However, both microcontrollers 11 and 21 can access the entire memory 30 for read purposes.

An access interlock test, which can expediently be carried out before the writing of the safety message to be formed jointly, is produced, for example, on the basis of the following procedure:

The microcontroller 11 attempts to write a default value, for example FFh, to all of the memory locations in the DPM 30.

The microcontroller 21 then attempts to write a further default value, for example 00h, to all of the memory locations in the DPM 30.

The microcontroller 11 then reads all of the memory locations in the DPM 30 and checks whether the value 00h has been entered only in those memory locations which are assigned to the microcontroller 21 and, possibly, whether the value FFh has been entered in the memory locations assigned to the microcontroller 11. The microcontroller 11 then once again attempts to write the value FFh to all the memory locations.

The microcontroller 21 then reads all of the memory locations in the DPM 30, and checks whether the value FFh has been entered only in those memory locations assigned to the microcontroller 11 and, possibly, whether the value 00h has been entered in the memory locations assigned to the microcontroller 21.

If an error or fault occurs in the case of this expected behavior, then the error or fault is identified and a safety-based function is initiated, for example the process changes to a safe state. Otherwise, it can be assumed that the access interlock is operating correctly. One major feature of the implementation according to the invention is thus that the actual write signals from the respective microcontroller 11 or 21 are not used directly, but that a linking process with the addresses is carried out instead. It is therefore possible to write only to those addresses which are allocated to the respective microcontroller.

The data which is stored in the RAM in the DPM 30 is in consequence protected by means of a protocol that is safe to a very high degree. In a similar manner to the transmission channel itself, the DPM 30 is not regarded as being safe. The safety is thus achieved, inter alia, on the basis of an expected behavior for the configuration and the content of the data in the area annotated with M in FIG. 2. In consequence, the further processing or distribution of the data temporarily stored in the DPM 30 can take place, for example via a further microcontroller 35 which transfers the data from the DPM 30 on a single channel, with the data then being transferred to the bus system, for example by being input into a field bus 40.

By carrying out a self-verification process, the two microcontrollers 11 and 21 thus automatically monitor the respective access rule effectively while the safety message is being written to the buffer store 30, and the data which is stored in the memory can be transferred on one channel via an interface of the buffer store 30 for transfer to a protocol chip, a further microcontroller or some other intelligent unit. Since it is no longer possible to produce a complete safety message in the event of a failure or fault in the microcontroller 11 or 21, faults are necessarily identified, and a safety-based function is initiated. The safety analysis of the redundant architecture M thus ends with the storage of the data in the memory 30. From here on, the safety mechanism of the protocol comes into play, because the errors or faults which are possible from this point are taken into account as before in any case for transmission, and must be coped with. An error or fault under consideration for this purpose is fundamentally a message corruption for the testing and certification of "bus systems for the transmission of safety-relevant messages".

The unconditional linking, as described above, of the write authorization with the positions to be written to in the safe protocol to be formed jointly and the unrestricted read authorization of both microcontrollers thus ensure the comparison and verification of the safety message to be transmitted, before the actual transmission via a bus 40, just by the use of standard components. In consequence, a microcontroller 11 or 21 is not able to send a safety message on its own.

The functional circuit diagram illustrated in FIG. 2 can thus be produced just by a simple logic circuit but may, for example, also be formed by an FPGA. Furthermore, of course, it is also possible to use a simple standard RAM instead of the DPM 30 illustrated in FIG. 2. However, the use of the DPM simplifies the circuit with regard to reading the safety message from the buffer store. For a person skilled in the art, it is obvious that the circuit arrangement illustrated in FIG. 2 represents only one of the possible technical implementations for unambiguous write access authorization. By way of example, the data lines may also be split such that one computer can make write accesses only on the upper data lines, and a redundant computer can make write accesses only on the lower data lines of the buffer store. Furthermore, a write access rule according to the invention can be used for more than just two redundant computers/processing channels.

The invention claimed is:

1. A method for single-channel bus coupling of a safety-critical process, comprising:
processing a data record via at least two redundant processing channels on a protocol-specific basis using identical laws in each of the redundant processing channels to form one redundant safe protocol with two redundant safety messages, wherein the two redundant safety messages processed with identical laws are joined together to form a further common safe protocol, whereby each of the at least two processing channels accesses a plurality of register locations in a common buffer register, with write authorization for each register location of the plurality of register locations being allocated only once in such a way that the two redundant safety messages are joined together in components by in each case writing in different components of the respective safety-based protocols to form the further common safe protocol.

2. The method of claim 1, wherein, before transferring the common safe protocol from the buffer register to a bus, the content of each register location in the buffer register is read by each of the redundant processing channels in order to verify the jointly formed common safe protocol.

3. The method of claim 1, wherein, before the writing of the jointly formed common safe protocol, the redundant safe protocols are checked by the processing channels to ensure that they are the same as one another.

4. The method of claim 1, further comprising carrying out a test procedure for verification of an unambiguously associated write authorization.

5. The method of claim 4, further comprising making an attempt via each of the processing channels during the test procedure to write a respectively different, specifically associated default value to all of the register locations in the buffer register, and all of the register locations in the buffer register are then read out via each of the processing channels, and the contents of the register locations are verified for unique interleaving.

6. The method of claim 5, wherein the test procedure is carried out more than once and/or the register locations are alternately written to and read from via different processing channels.

7. The method of claim 6, further comprising using a standard random access memory (RAM) or a standard dual port memory (DPM) as the buffer register.

8. The method of claim 1, wherein the jointly formed common safe protocol is transferred from the buffer register on a single channel to a bus coupling device which is designed on an application-specific basis.

9. The method of claim 1, further comprising storing the further common safety protocol in the common buffer register and coupling the common buffer register to a single-channel bus.

10. An apparatus for single-channel bus coupling of a safety-critical process, comprising:
- at least two redundant computers configured to process an identical input data record using identical laws to form one safe protocol;
- a circuit arrangement for connection of each of the at least two redundant computers to a common buffer register, the common buffer register having a plurality of register locations each assigned to one of the at least two redundant computers; and
- a further common safe protocol, wherein, when the at least two redundant computers write to the common buffer register, a further identical common safe protocol is formed by joining messages processed with the identical laws from the at least two redundant computers by in each case writing in different components of the plurality of register locations each assigned to one of the at least two redundant computers to form the further identical common safe protocol.

11. The apparatus of claim 10, wherein the circuit arrangement is designed such that a read access capability is provided for each of the at least two redundant computers for each register location in the common buffer register.

12. The apparatus of claim 10, wherein the at least two redundant computers are connected to one another via a communication interface.

13. The apparatus of claim 10, wherein the at least two redundant computers each have an integrated protocol chip or are connected on an output side to a protocol chip, or have software which provides a function of a protocol chip.

14. The apparatus of claim 10, wherein, the apparatus is in the form of a bus subscriber unit, and the at least two redundant computers are connected on an input side at least to input channels for linking of process data input units, or wherein the apparatus is in the form of a bus control unit.

15. The apparatus of claim 10, wherein the circuit arrangement is designed using simple logic or is in the form of a field programmable gate array (FPGA).

16. The apparatus of claim 15, wherein the common buffer register is a standard random access memory (RAM) or a standard dual port memory (DPM).

17. The apparatus of claim 10, wherein the common buffer register has an interface for direct single-channel bus coupling or for single-channel linking to a bus coupling device which is designed on an application-specific basis.

18. The apparatus of claim 10, wherein the common buffer register stores the further common safety protocol and is further coupled to a single-channel bus.

19. A method for single-channel bus coupling of a safety-critical process, comprising:
- processing a data record via redundant processing channels;
- generating a safety protocol from the data record using identical safety laws in each of said redundant processing channels resulting in a redundant safety message from each of said redundant processing channels; and
- generating a further safety protocol by joining the redundant safety messages generated using the identical safety laws in a common buffer register by writing in different components of the respective redundant safety messages,
- wherein each of the redundant processing channels accesses a plurality of memory locations in a common buffer register, the method further comprising allocating each of the plurality of memory locations only once.

* * * * *